United States Patent
Kurzweil et al.

(10) Patent No.: US 6,173,264 B1
(45) Date of Patent: *Jan. 9, 2001

(54) READING SYSTEM DISPLAYING SCANNED IMAGES WITH DUAL HIGHLIGHTING

(76) Inventors: Raymond C. Kurzweil, 203 Lake Ave., Newton, MA (US) 02161; Firdaus Bhathena, 62 Spring St., Apt. 2R, Cambridge, MA (US) 02141

( * ) Notice: Under 35 U.S.C. 154(b), the term of this patent shall be extended for 0 days.

This patent is subject to a terminal disclaimer.

(21) Appl. No.: 09/211,874

(22) Filed: Dec. 15, 1998

Related U.S. Application Data

(63) Continuation of application No. 08/883,686, filed on Jun. 27, 1997, now Pat. No. 5,875,428.

(51) Int. Cl.$^7$ .................................................. G10L 13/00
(52) U.S. Cl. ..................... 704/260; 704/270; 704/271; 704/272; 704/276
(58) Field of Search ............................ 704/260, 270, 704/271, 276, 277; 345/338, 348, 340; 707/512

(56) References Cited

U.S. PATENT DOCUMENTS

| | | |
|---|---|---|
| 4,760,606 | 7/1988 | Lesnick et al. ................... 382/48 |
| 5,384,863 | 1/1995 | Huttenlocher et al. ............ 382/9 |
| 5,523,775 | 6/1996 | Capps ................................ 345/179 |
| 5,845,301 * | 12/1998 | Rivette et al. ..................... 707/512 |
| 5,875,428 * | 2/1999 | Kurzweil et al. .................. 704/260 |
| 5,875,448 * | 2/1999 | Boys et al. ........................ 704/260 |
| 5,999,903 * | 12/1999 | Dionne et al. ..................... 704/271 |

\* cited by examiner

*Primary Examiner*—David R. Hudspeth
*Assistant Examiner*—Susan Wieland

(57) ABSTRACT

A reading system includes a computer and a mass storage device including software comprising instructions for causing a computer to accept an image file generated from optically scanning an image of a document. The software convert the image file into a converted text file that includes text information, and positional information associating the text with the position of its representation in the image file. The reading system has the ability therefore to display the image representation of the scanned image on a computer monitor and permit a user to control operation of the reader by with respect to the displayed image representation of the document by using the locational information associated with the converted text file. Also described are techniques for dual highlighting spoken text and a technique for determining the nearest word to a position selected by use of mouse or other pointing device operating on the image representation as displayed on the monitor.

21 Claims, 14 Drawing Sheets

READING SYSTEM DISPLAYING SCANNED IMAGES WITH DUAL HIGHLIGHTING

This appln is a con of Ser. No. 08/883,686 Jun. 27, 1997 U.S. Pat. No. 5,875,428.

BACKGROUND OF THE INVENTION

This invention relates generally to educational tools and more particularly to reading machines which are used as part of a remedial reading program to assist individuals with learning disabilities.

As it is known in the art, reading machines have been used to improve the educational attainment of individuals with learning disabilities. In general, known reading machines are computer based. That is, the reading machines often include a personal computer having specialized software that provides the reading machine function. In addition, the reading machines include other PC type components such as a monitor, an audio system, a disk or mass storage device, and a keyboard. In general, specialized software processes an input source document and generates synthetic speech to enable a user to hear the computer read through the document a word, line, sentence etc. at a time. Often these reading machines include a scanner to provide one technique to input source documents to the reader.

The scanner scans a document and provides an image file representation of the document to the personal computer. The personal computer using optical character recognition software produces an OCR file including generated text information. The OCR file is used by display system software to display a text-based representation of the scanned document on a monitor. The OCR file text is also used by speech synthesis software to synthesize speech. In addition, the known systems also place a highlight on a unit of text representation of the document. The highlight is typically a sentence or paragraph as selected by the user.

One problem, therefore, with the known systems is that the visual display that is presented to the user is a character or OCR based representation of the scanned document having a single highlight. With the single highlight there is no visual association of the spoken text to the highlight.

SUMMARY OF THE INVENTION

In accordance with the present invention, a computer program for residing on a computer readable medium and for use in a reading machine includes instructions for causing a computer to display an image representation of a scanned document on a computer monitor and apply a first highlighting indicia to a portion of the document as displayed on a computer monitor in accordance with positional information linking the displayed image representation of the document to a converted text file representation of the document. The program further includes instruction to cause the computer to apply a second highlighting indicia to a selected word in the selected portion of the document, in accordance with positional information linking the position of the word in the image to a converted text file representation of the image. With such an arrangement, a dual highlighting is applied to an image representation of a document as displayed on a monitor. The dual highlighting provides a enhanced feature to highlight a first portion of text and to visually associate a word on the monitor to the actually spoken speech with a second highlight.

BRIEF DESCRIPTION OF THE DRAWINGS

The foregoing features and other aspects of the invention will be described further in detail by the accompanying drawings, in which.

DESCRIPTION OF THE PREFERRED EMBODIMENTS

Figure 1:
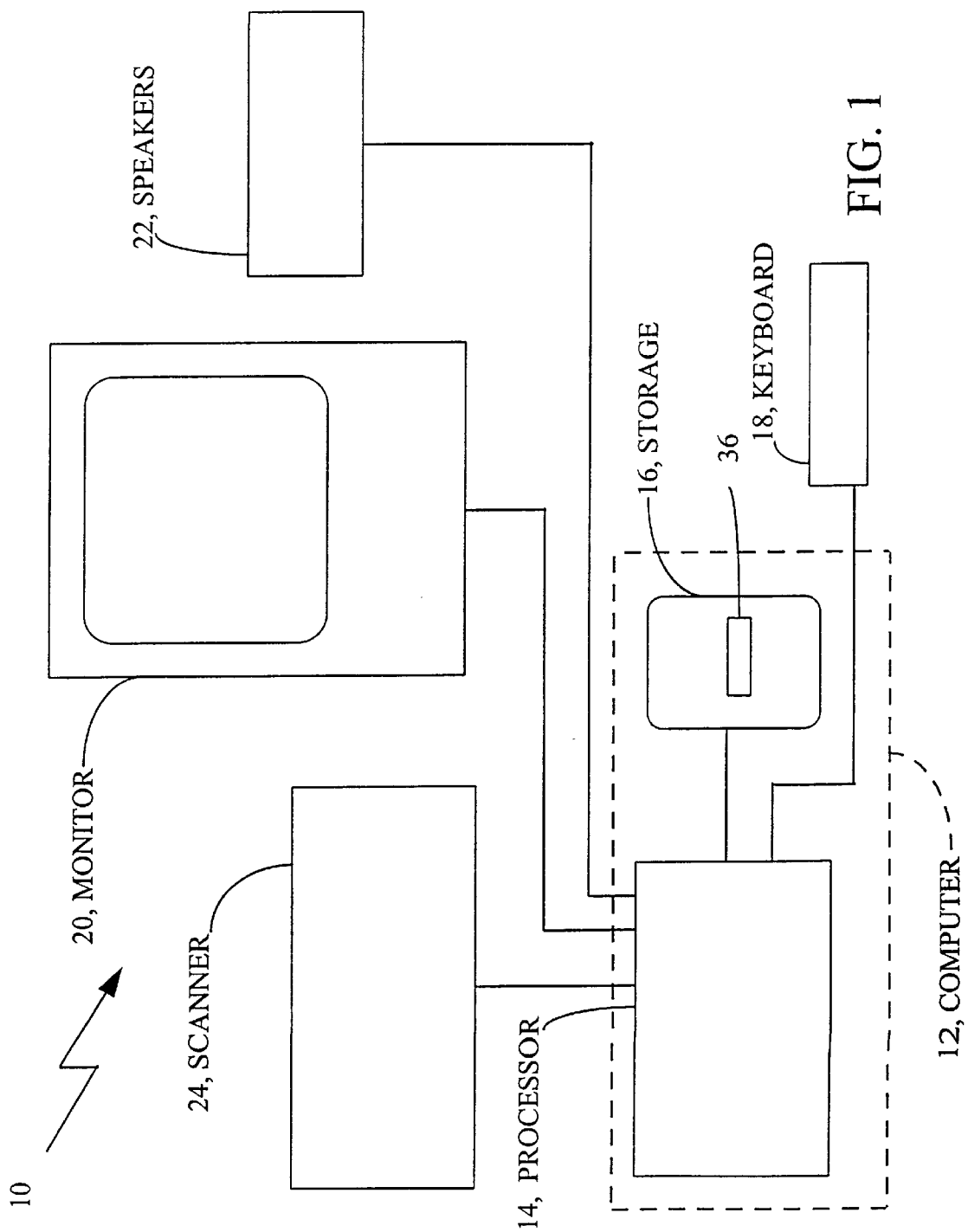
FIG. 1 is a block diagram view of a reading system.

Referring now to FIG. 1, a reading machine 10 is shown to include a computer system 12. The computer system 12 is generally a personal computer or can alternatively be another type of computer and typically includes a central processor unit (not shown) that is part of a processor 14. A preferred implementation of the processor 14 is a Pentium® based system from Intel Corporation, Santa Clara, Calif., although other processors could alternatively be used. In addition to the CPU, the processor includes main memory, cache memory and bus interface circuits (not shown). The computer system 12 includes a mass storage element 16, here typically the hard drive associated with personal computer systems.

The reading system 10 further includes a standard PC type keyboard 18, a standard monitor 20 as well as speakers 22, a sound card (not shown), a pointing device such as a mouse 19 and a scanner 24 all coupled to various ports of the computer system 10 via appropriate interfaces and software drivers (not shown). The computer system 12 here operates under a WindowsNT® Microsoft Corporation operating system although other systems could alternatively be used.

Resident on the mass storage element 16 is image display and conversion software 30 (FIG. 2) that controls the display of a scanned image provided from scanner 24. In addition, the software 30 permits the user to control various features of the reader by referencing the image representation of the document displayed by the monitor.

Figure 2:
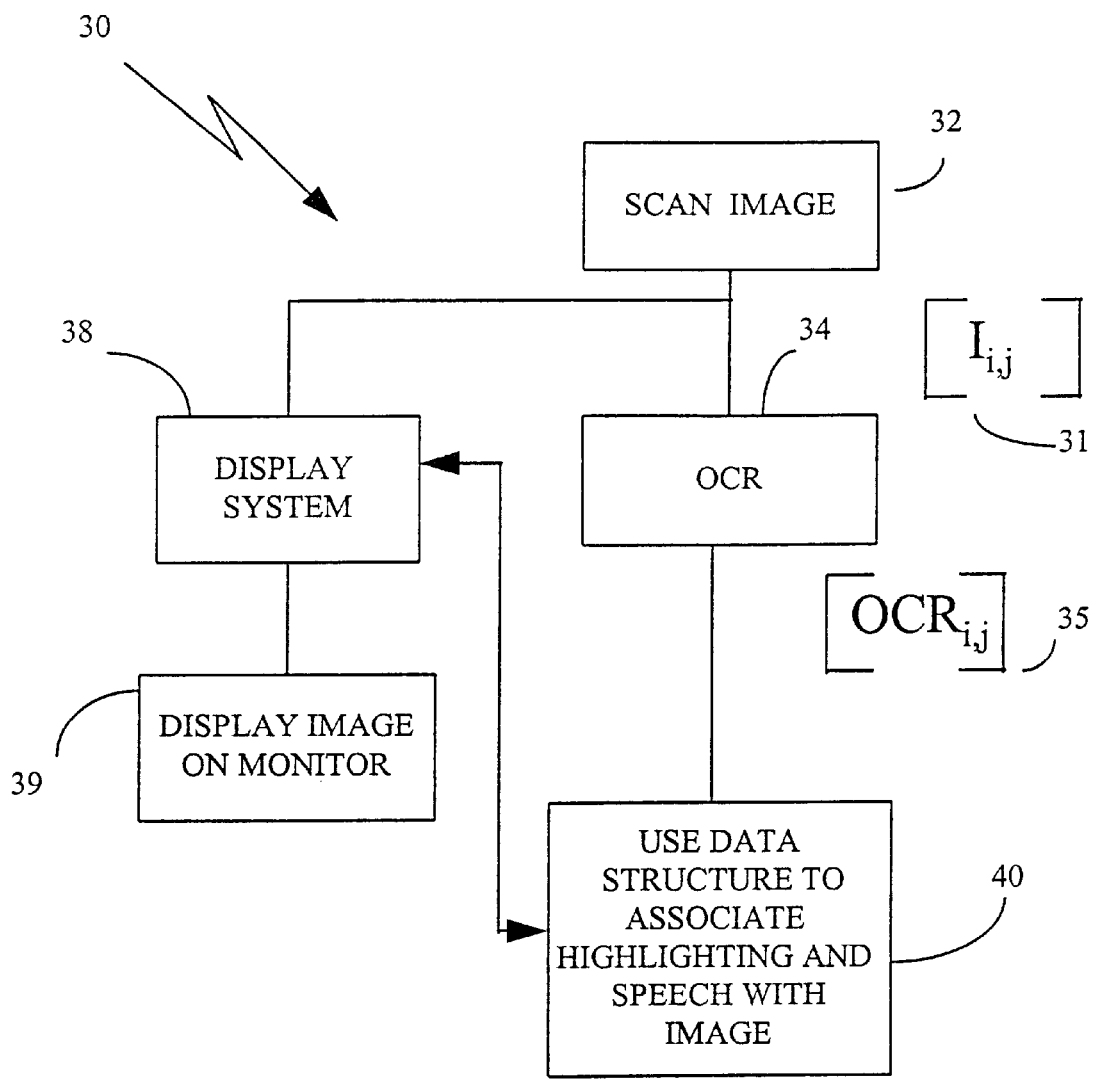
FIG. 2 is a flow chart showing steps used in displaying a scanned image representation of a document for use in the reading system of FIG. 1.

Referring now to FIG. 2, the steps used in the image display and conversion software 30 include scanning an input document to provide an image file (step 32). In general the input document is scanned in a conventional manner and produces an image file 31 which is fed to an optical character recognition (OCR) module 34. The OCR module 34 uses conventional optical character recognition techniques on the data provided from the scanned image 32 to produce an output data structure 35. Alternatively, image-like representations can be used as a source such as a stored bit-mapped version of a document.

A preferred arrangement of the output data structure is described in conjunction with FIGS. 6–9. Suffice it here to say, however, that the array of OCR data structures generally denoted as 35 produced by step 34 includes information corresponding to textual information or the OCR converted text, as well as, positional and size information associated with the particular text element. The positional and size information associates the text element to its location in the image representation of the document as displayed on the monitor 20.

Figure 7:
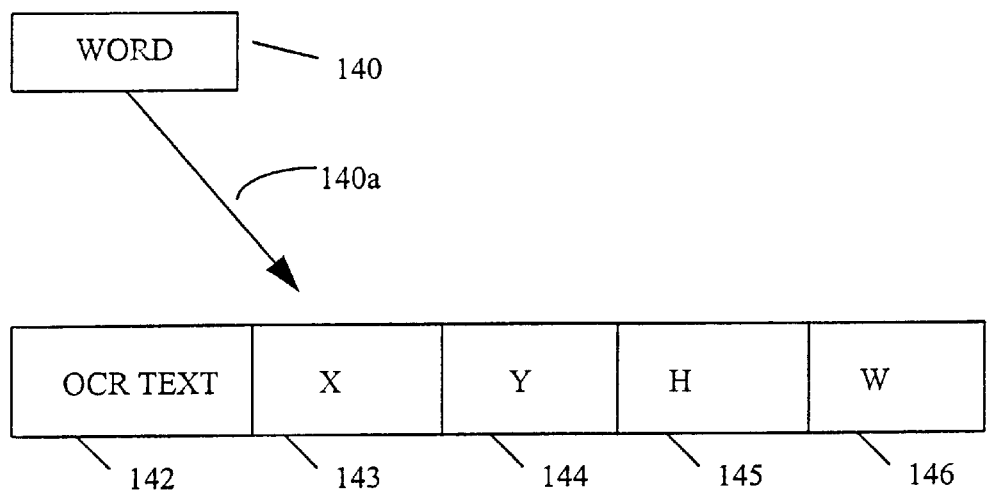
FIGS. 7–9 are diagrammatical views of detailed portions of the data structure of FIG. 6.

Referring momentarily to FIG. 7, therefore, it can be seen that a data structure element 140 includes for a particular word an OCR text representation of the word stored in field 142. The data structure 140 also has positional information including X-axis coordinate information stored in field 143, Y-axis coordinate information stored in field 144, height information stored in field 145 and width information stored in field 146. This positional information defines the bounds of an imaginary rectangle enclosing an area associated with the corresponding word. That is, if a pointer device such as a mouse has coordinates within the area of this rectangle, then the mouse can be said to point to the word within the defined rectangle.

The image file 31 is also fed to a display system 38 which in a conventional manner processes the image file to permit it to be displayed on the monitor at step 39. As shown, the text file 35 provides an input along with other commands driven by the operating system (not shown) to a module 40 which is used to associate user initiated actions with an image representative of a scanned document. In addition, both the image file 31 and the text file 35 are stored in the reading system for use during the session and can be permanently stored for latter use. The files are stored using generally conventional techniques common to WindowsNT® or other types of operating systems.

Figure 3:
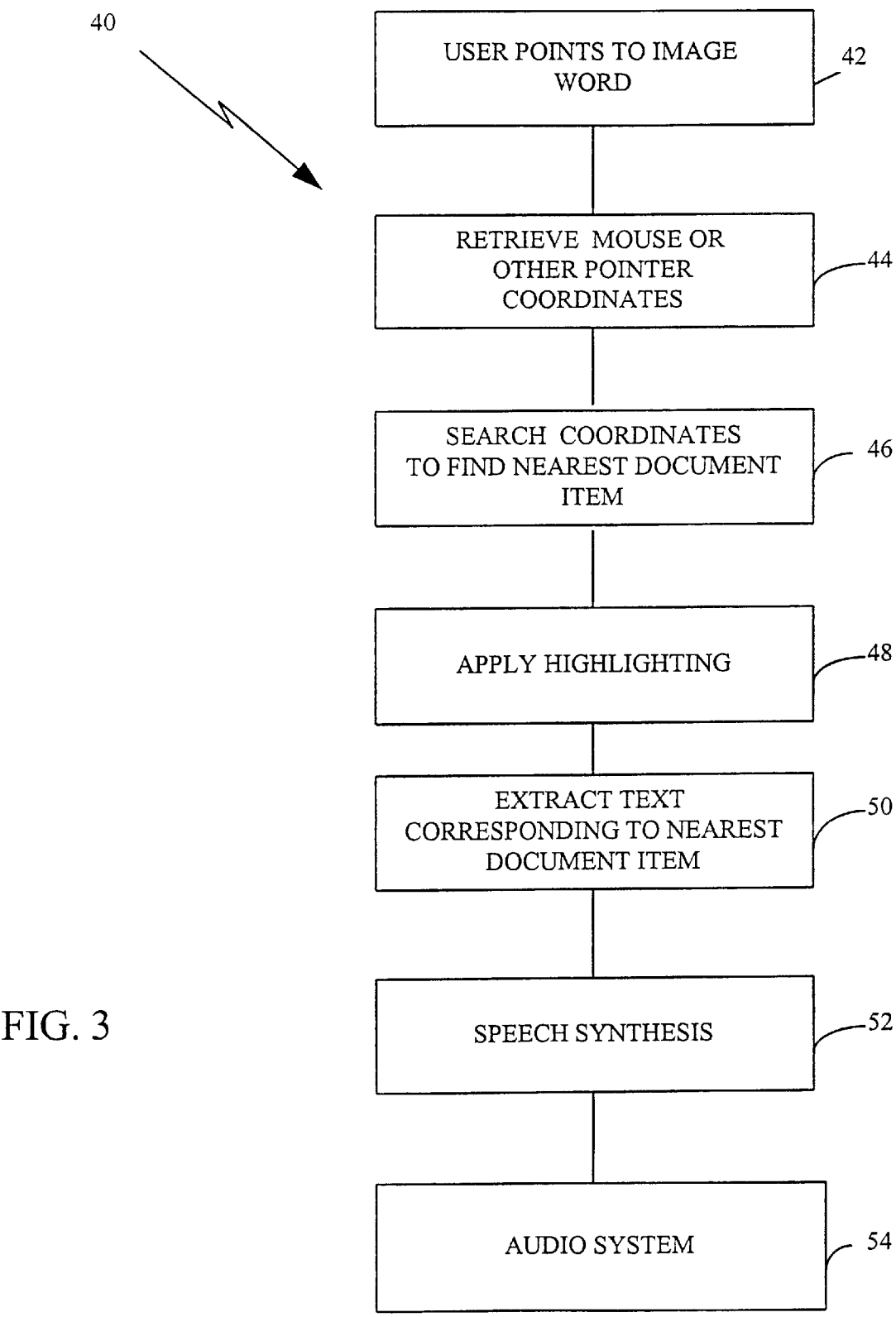
FIG. 3 is a flow chart showing steps used to associate user selected text on the displayed image representation to OCR generated text to permit voice synthesis and highlighting of the image representation.

Referring now to FIG. 3, the user controls operation of the reading system 10 with reference to the image displayed on the monitor 20 by the steps generally shown by the software module 40.

A user can initiate reading of the scanned document at the beginning of the document by selecting a reading mode. Alternatively, the user can have the document start reading from any point in the document by illustratively pointing to the image representation of an item from the scanned document displayed on the monitor at step 42. The document item is the actual image representation of the scanned document rather than the conventional text file representation. The item can be a single word of text, a line, sentence, paragraph, region and so forth. The user activates a feature to enable the reading machine to generate synthesized speech associated with the selected image representation of the document item. For purposes of explanation, it will be assumed that the document item is a word.

In addition to pointing to a word, a pointer such as a mouse can point within the text in an image in other ways that emulate the pointer behavior typically used in computer text displays and word processing programs. For instance, by simply pointing to a word the software selects a position in the text before the word; whereas, pointing to a word and clicking a mouse button twice will cause the word to be selected and pointing to a word and clicking an alternate mouse button selects several words, starting at a previously determined point and ending at the word pointed to.

The user can use a mouse or other type of pointing device to select a particular word. Once selected, the software fetches the coordinates associated with the location pointed to by the mouse 19 (FIG. 1) at step 44. Using these coordinates the word or other document item nearest to the coordinates of the mouse is determined. The information in the data structure 100 is used to generate highlighting of the word as it appears on the display item as well as synthesized speech as will be described.

Figure 4A:
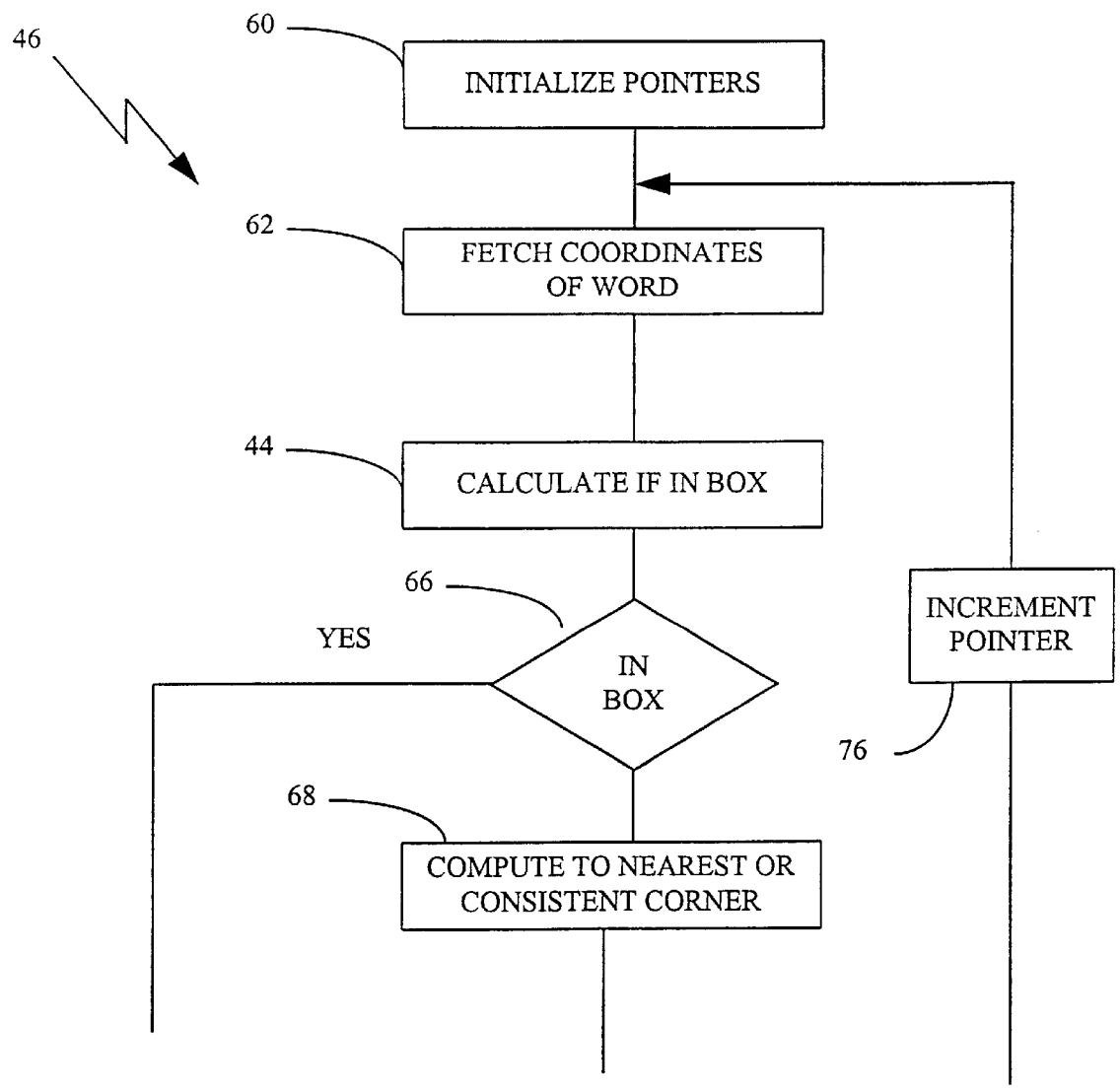
FIGS. 4A–4C are flow charts which show steps used in calculating a nearest word for use in the process described in conjunction with FIG. 3.
Figure 4B:
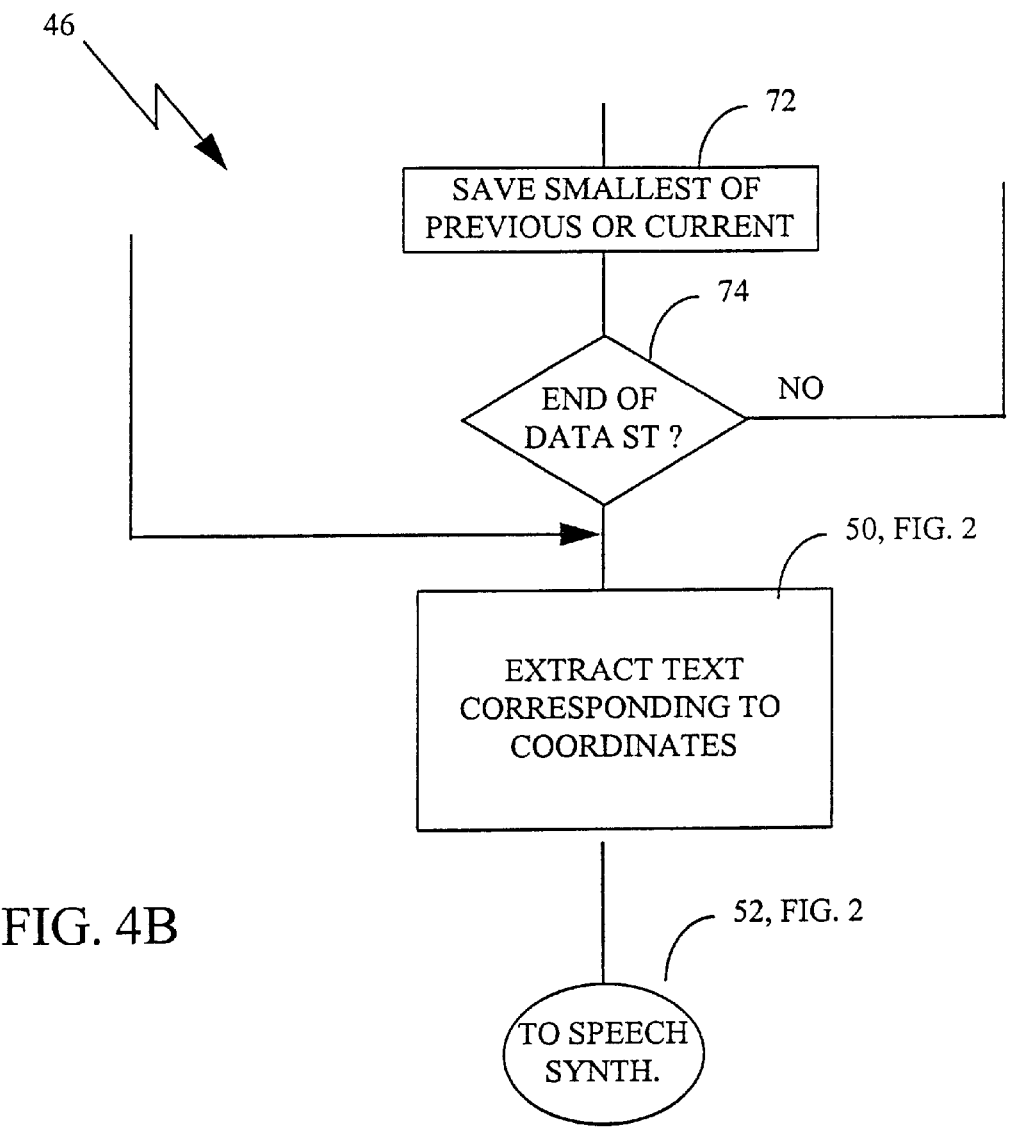
Figure 4C:
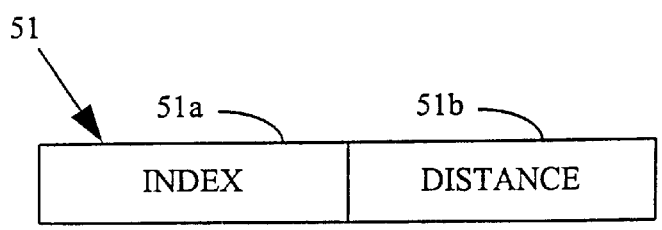

The searching step 46 as will be further described in conjunction with FIGS. 4A–4C will search for the nearest word. Alternatively, a searching step 46' as will be described with FIGS. 10A–10C can also be used. The search operation performed by searching step 46' is based upon various attributes of a scanned image.

After the nearest word or nearest document item has been determined at step 46 or 46', the highlighting is applied to an area associated with the item or word at step 48. The text corresponding to the nearest document item is also extracted at step 50 and the text representation is fed to a speech synthesizer 52 to produced electrical signals corresponding to speech. The electrical signals are fed to the audio system 54 to produce speech corresponding to the nearest document item while the monitor 20 displays the item and highlighting is applied to the item.

Figure 4D:
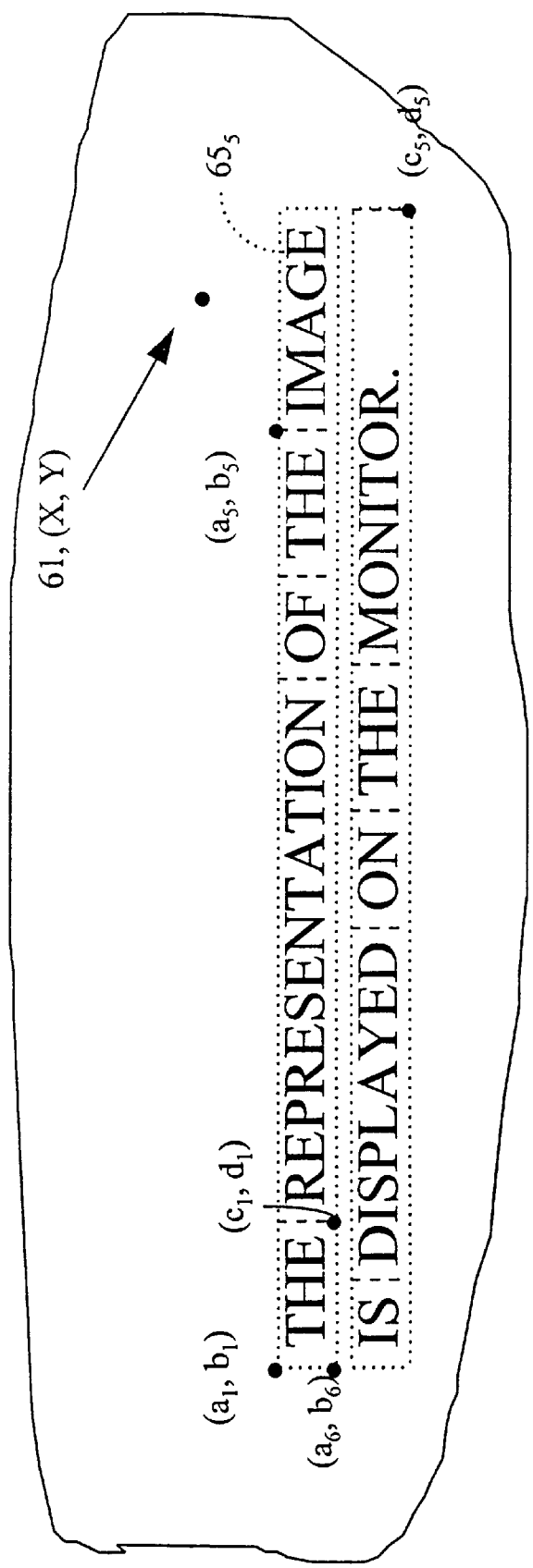
FIG. 4D is a pictorial illustration of a portion of an image representation of text displayed on a monitor useful in understanding the process of FIGS. 4A–4C.
Figure 6:
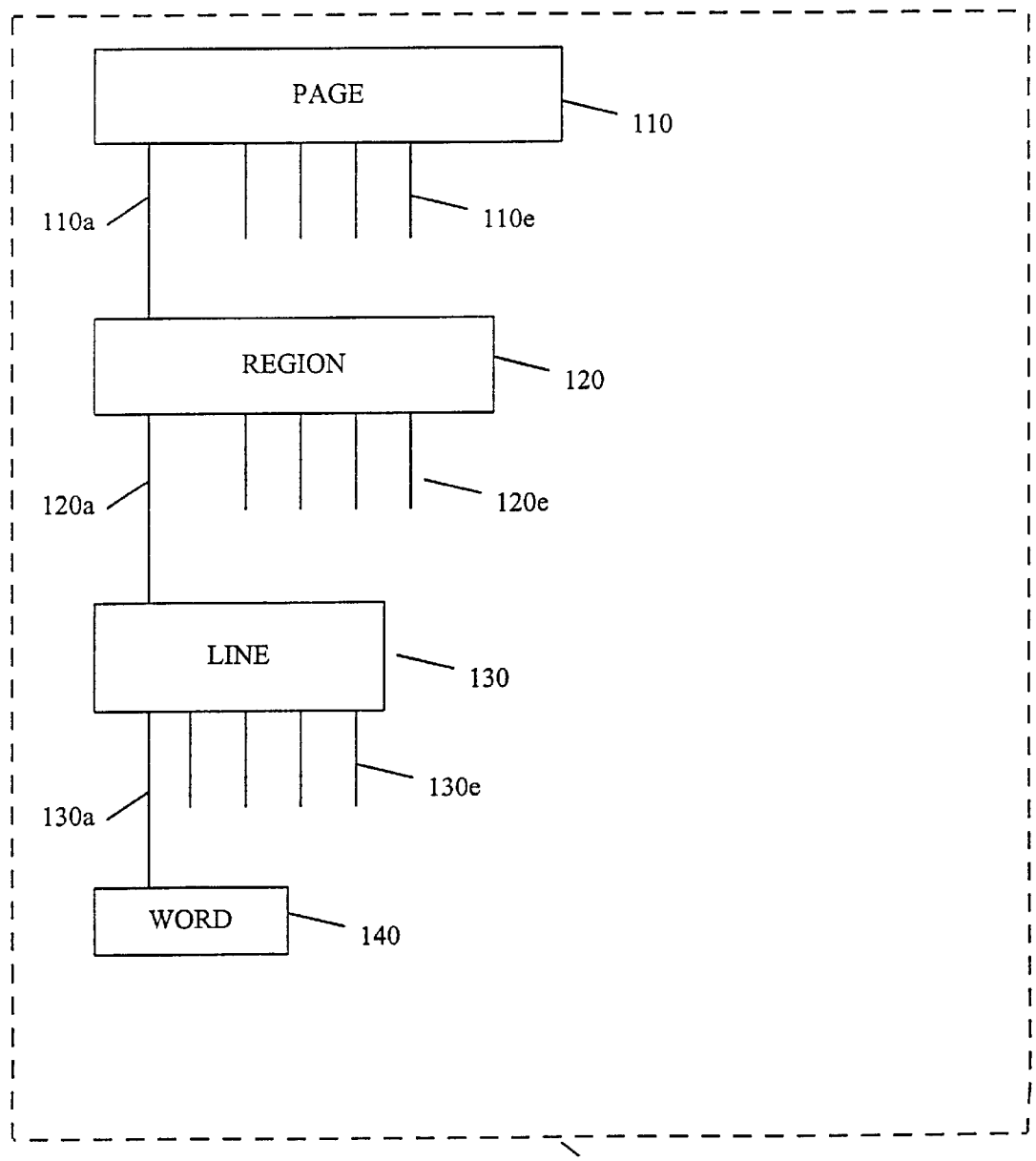
FIG. 6 is a diagrammatical representation of a data structure used in the process of FIG. 3.

Referring now to FIGS. 4A–4C, the process 46 used to determine a nearest word in a scanned image are shown. At step 60 a pointer is initialized and a maximum value is loaded into a displacement field 51b of structure 51 (FIG. 4D). The displacement field 51b is used to store the smallest displacement between a word boundary and the coordinates of the pointing device. The pointer initialized at step 60 is a pointer or index into the OCR generated data structure 35 (FIG. 6). The software 46 retrieves each word entry in the data structure 35 to determine for that word in accordance with the image relative position information associated with the OCR text generated word whether or not that particular word is the closest word to the coordinates associated with the user's pointing device.

At step 62 the coordinates associated with a first one of the words are fetched. At step 64 the coordinates associated with the first one of the fetched words are used to determine whether the pointing device is pointing to a location within a box $65_5$ that is defined around the word. Thus, as shown in conjunction with FIG. 4D, the mouse points to a spot 61 having coordinates $X_i$, $Y_j$. For any document item on the scanned image, an imaginary box here $65_5$ is assumed to exist about the word "IMAGE" in FIG. 4D. Thus, if the pointing device coordinates fall within the box $65_5$, the pointing device would be considered to point to the document item "IMAGE" associated with the box $65_5$.

In the data structure 35 each of the words will have associated therewith the OCR text converted from the image file 31, as well as position and size data that identifies the position and size of the word as it appears on the original document. Accordingly, this information also locates the word as it appears in the displayed image representation of the document. Thus, when determining the closest word to a position pointed to by a mouse, it is necessary to determine the boundaries of the box that the particular word occupies. At step 64, the software determines whether or not point 61 falls within the box by considering the following:

For a mouse coordinate position (X, Y) the location pointed to by the mouse can be considered to be within a region of an image word having points defined by coordinates $(a_i, b_j)$ and $(c_k, d_l)$ where $c_k=a_i+w$ and $d_l=b_j-h$, if $X \geq a_i$ and $Y \leq b_j$ and $X \leq c_k$ and $Y \geq d_l$ where it is assumed here that the positive direction of the coordinates is upward and to the right.

If this condition is satisfied, then the point 61 can be considered to be within the box and, hence, at step 66 control will pass directly to step 50 (FIG. 4B). From the information mentioned above, therefore, the point (c, d) can be determined by adding the width of the box to the x coordinate ($a_i$) associated with the image and substracting the height of the box from the y coordinate ($b_j$) associated with the image.

If, however, the point 61 is not within the box as is shown, then the software 46 determines the word which is nearest to the point 61 at step 68 by one of several algorithms. A first algorithm which can be used is to compute the distance from a consistent corner of the box associated with the word to the position of the mouse pointer 61. In general, the distance (S) to a consistent corner would be computed as the "Pythagorean" technique as follows:

$$S=((X-a_i)^2+(Y-b_j)^2)^{-2}$$

Alternatively, this equation can be used at each corner of each box and further processing can be used to determine which one of the four values provided from each corner is in fact the lowest value for each box.

In either event, the computed value (S) is compared to the previous value stored in displacement field 51b. Initially, field 51b has a maximum value stored therein and the smaller of the two values is stored in field 51b at step 72. Accordingly the first computed value and the index associated with the word are stored in the structure 51 as shown in FIG. 4C. At step 74 it is determined whether or not this is the end of the data structure. If it is the end of the data structure then control branches to step 50 and hence step 52. If it is not the end of the data structure then the pointer is incremented at step 76 and the next word in the data structure as determined by the new pointer value is fetched at step 62.

The second time through the process 46 in general will be the same as the first time except that step 72 will determine whether the previously stored value ($S_p$) in fields 51a, 51b is greater than or less than a current calculated value ($S_c$) for the current word. If the current value ($S_c$) is less than the previous value $S_p$, then the current value replaces the previous value in field 51b and the index associated with the current value replaces the previous index stored in field 51a.

In this manner, the structure 51 keeps track of the smallest calculated distance (S) and the index (i.e., word) associated with the calculated distance. The process continues until the positional data for all of the words in the data structure associated with the particular image have been examined. The values which remain in the data structure 51 at the end process thus correspond to the closest word to the location pointed to by the mouse coordinates 61.

Referring now back to FIG. 3, once the nearest coordinates for the nearest data item are determined, the process 40 applies highlighting as appropriate to the selected item. Prior techniques for providing highlighting would simply highlight a line or a paragraph in the text representation displayed on the monitor. The highlighting would be of the current word that is being read aloud to the user. Although this is acceptable, a preferred approach as described herein applies double highlighting and still preferably applies double highlighting to an image representation of a scanned document.

The selected paragraph or sentence is highlighted with a first transparent color, whereas, each individual word as the word is spoken through the speech synthesizer at step 52 is highlighted with a second, different transparent color. Accordingly, highlighting is applied at step 48 in a manner as will now be described.

Figure 5:
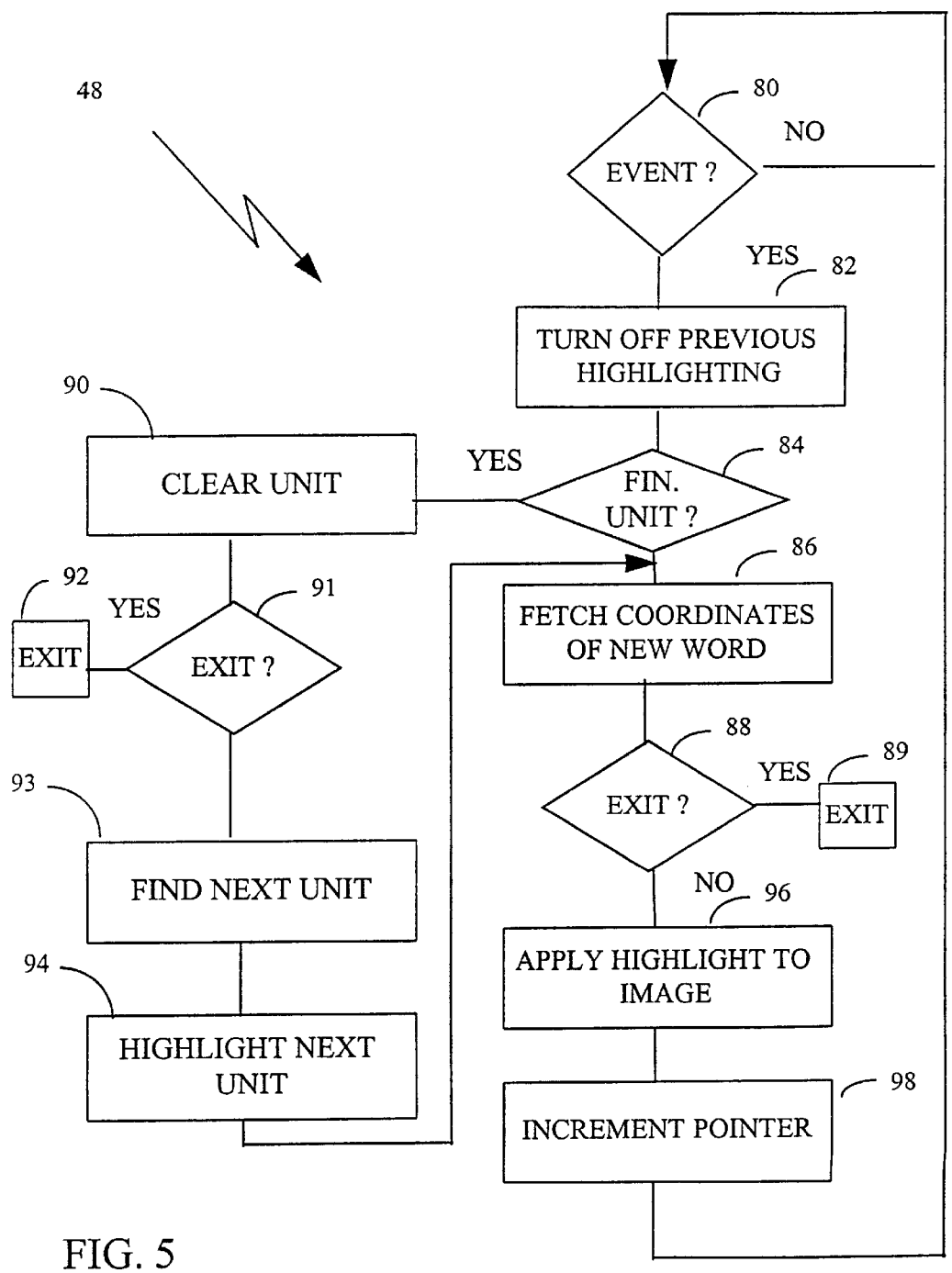
FIG. 5 is a flow chart showing steps used to highlight a selected word for use in the process described in conjunction with FIG. 3.

Referring now to FIG. 5, the highlighting process 48 is shown to include a step 80 in which an event is awaited by the software 48. The event is typically an operating system interrupt-type driven operation that indicates any one of a number of operations such as a user of the reading machine 10 initiating speech synthesis of a word, sentence or paragraph. The highlighting process 48 remains in that state until an event occurs. When an event occurs all previous highlighting is turned off at step 82. The previous highlighting is turned off by sending a message (not shown) to the display system 38 causing the display system to remove the highlighting. At step 84 the highlighting process checks whether a unit of text has been completed. For example, a unit can be a word, line, sentence, or a paragraph for example, as selected by the user.

If a unit of text has been completed, then highlighting of the unit is also turned off at step 90. The software checks for an exit condition at step 91 after the coordinates have been fetched. An exit condition as shown in step 91 can be any one of a number of occurrences such as reaching the last word in the array of OCR data structures 35 or a user command to stop coming from the keyboard 18 or other input device. If an exit condition has occurred at step 91, the routine 48 exits to step 92.

If an exit condition has not occurred, the next unit is determined at step 93. The next unit of text is determined by using standard parsing techniques on the array of OCR text structures 35. Thus, the next unit is determined by looking for periods for example to demarcate the end of sentences, and indents and blank lines to look for paragraphs. In addition, changes in the Y coordinate can be used to give hints about sentences and lines. Other document structure features can also be used. The next unit is then highlighted at step 94 by instructing the display system software 38 (FIG. 2) to apply a transparent color to the selected next unit. This is a first level of highlighting provided on a unit of image representation of the scanned document. Control transfers back to step 86.

At step 86 which is arrived at directly from step 84 or from step 92, the coordinates of the next word that is to be synthesized and highlighted are fetched. The software checks for an exit condition at step 88 after the coordinates have been fetched. An exit condition as shown in step 88 can be any one of a number of occurrences such as reaching the last word in the array of OCR data structures 35 or a user command to stop provided from the keyboard 18 or other input device. If an exit condition has occurred at step 88, the routine 48 exits to step 89. Otherwise, at step 96 a second highlight is applied to the image, here preferably with a different transparent color and applied only to the word which is to be synthesized by the speech synthesizer 52. The pointer to the next word in the data structure 35 is then incremented at step 98 to obtain the next word. The second highlighting is provided by sending a message to display system software 38 containing the positional information retrieved from the data structure. This process continues until an exit condition occurs at step 88.

It should be noted that the single and the dual highlighting above was described as applying two distinct, transparent colors to selected image representations of the displayed document. Alternatively, however other highlighting indicia can be used such as bold text, font style or size changes, italics, boxing in selected text, and underlining. In addition, combinations of these other indicia with or without colors could be used.

Referring now particularly to FIGS. 6–9, a preferred format for the data structure 35 provided by the OCR step 34 is shown. The data structure 35 is hierarchically organized. At the top of the data structure is a page, data structure 110. The page includes pointers 110a–110e to each one of a plurality of regions 120. A region is a rectangular shaped area that is comprised of one or more rectangular lines of text. If there are multiple line of text in a region, the lines do not overlap in the vertical direction. That is, starting with the top line, the bottom of each line is above the top of the next line. Here the regions may include headers, titles, columns and so forth. The headers may or may not straddle more than one column and so forth. The regions likewise include a plurality of pointers 120a–120e to each one of corresponding lines 130 shown in the data structure 130. The lines correspondingly have pointers 130a–130e to each of the words contained within the line.

Figure 8:
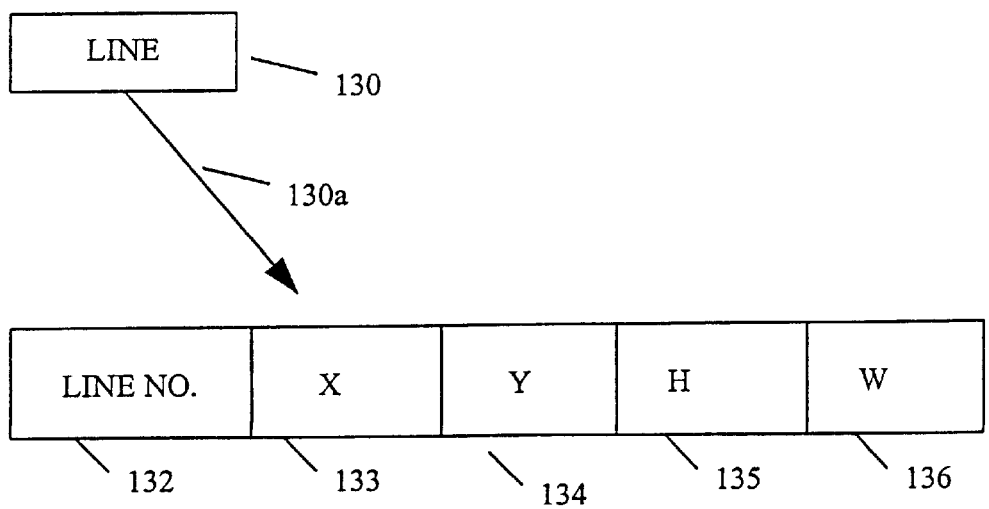
Figure 9:
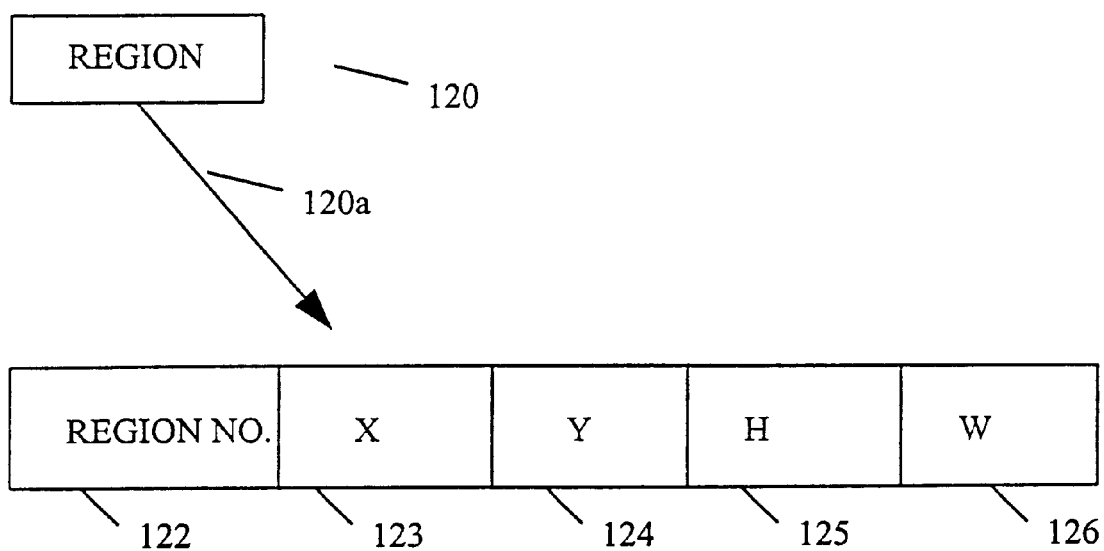

As shown in conjunction with FIGS. 7–9, the detail structure of items 140, 130 and 120 include a plurality of fields. Thus, for example, FIG. 7 for the word includes the text field 142 which has the OCR generated text and has fields 143 and 144 which provide rectangular coordinate information x and y, respectively, as well as fields 145 and 146 which provide here height and width information. Similar data are provided for the lines as shown in FIG. 8 as well as regions as shown in FIG. 9.

Now to be described will be a preferred method 46' to determining the nearest word associated with the position of a mouse or other pointing device. This approach is particularly advantageous for those situations where dragging operations of a mouse are often performed. The image may not provide an exact correspondence to the text as determined by the OCR recognition system. Also sometimes incorrect text is selected because the user does not precisely place the mouse or other pointing device directly on the desired item in the image. Also, when the pointer is positioned in the white space between lines, or in the white space to the left or right of lines, choosing the closest word to the pointer will not always give the result that a computer user would normally expect, based on the behavior of mouse selection on standard computer text displays. Moreover, minor misalignments may also occur between the image as displayed on the display and as provided by the OCR text file.

Figure 11:
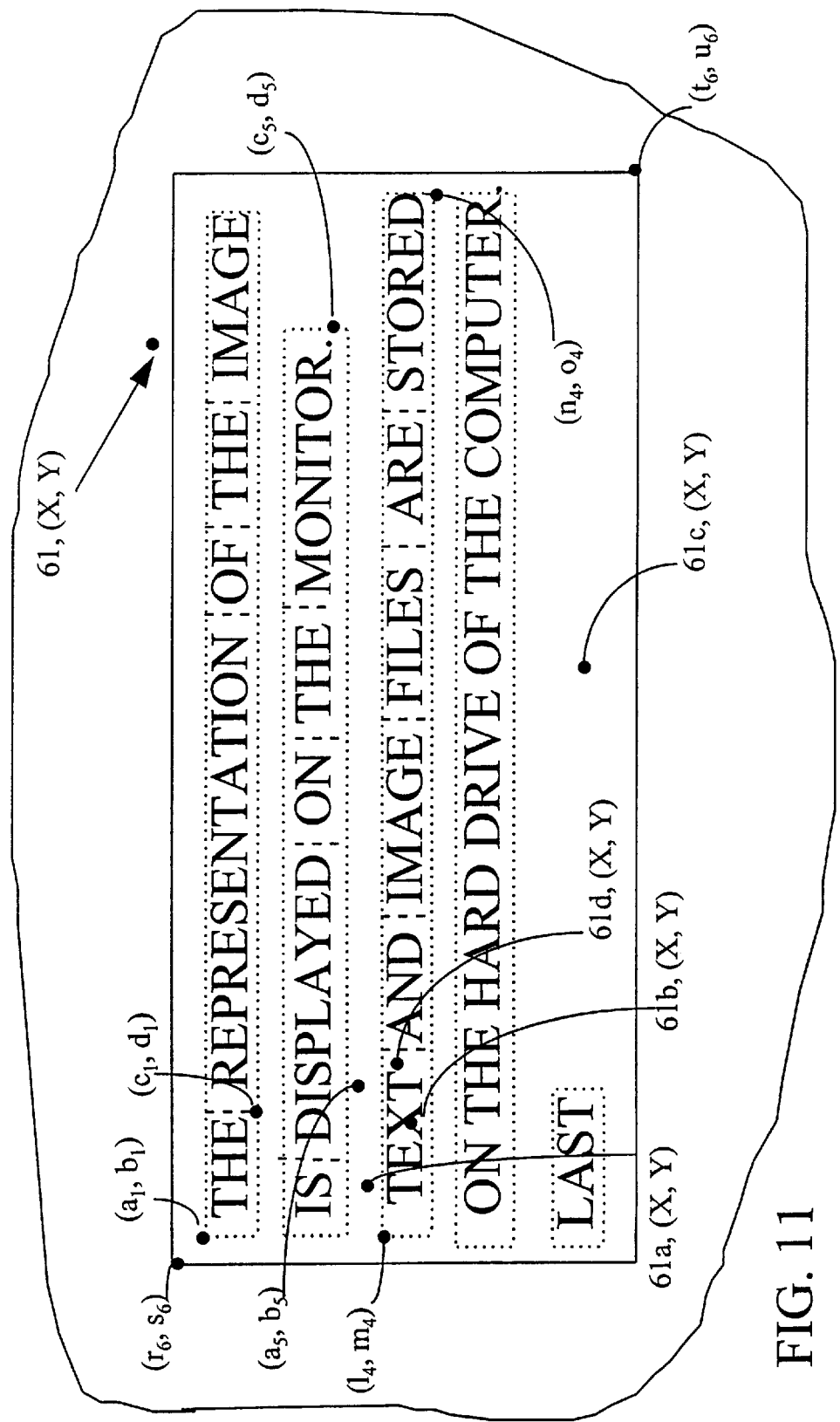
FIG. 11 is a pictorial illustration of a portion of an image representation of text displayed on a monitor useful in understanding the process of FIGS. 10A–10C.

Thus, for example, consider point 61c on FIG. 11. In the method 46 previously described, the closest word, which is "OF" in the previous line, will be chosen as the selected word. But on standard computer displays the point of selection would be after the word "LAST".

Figure 10A:
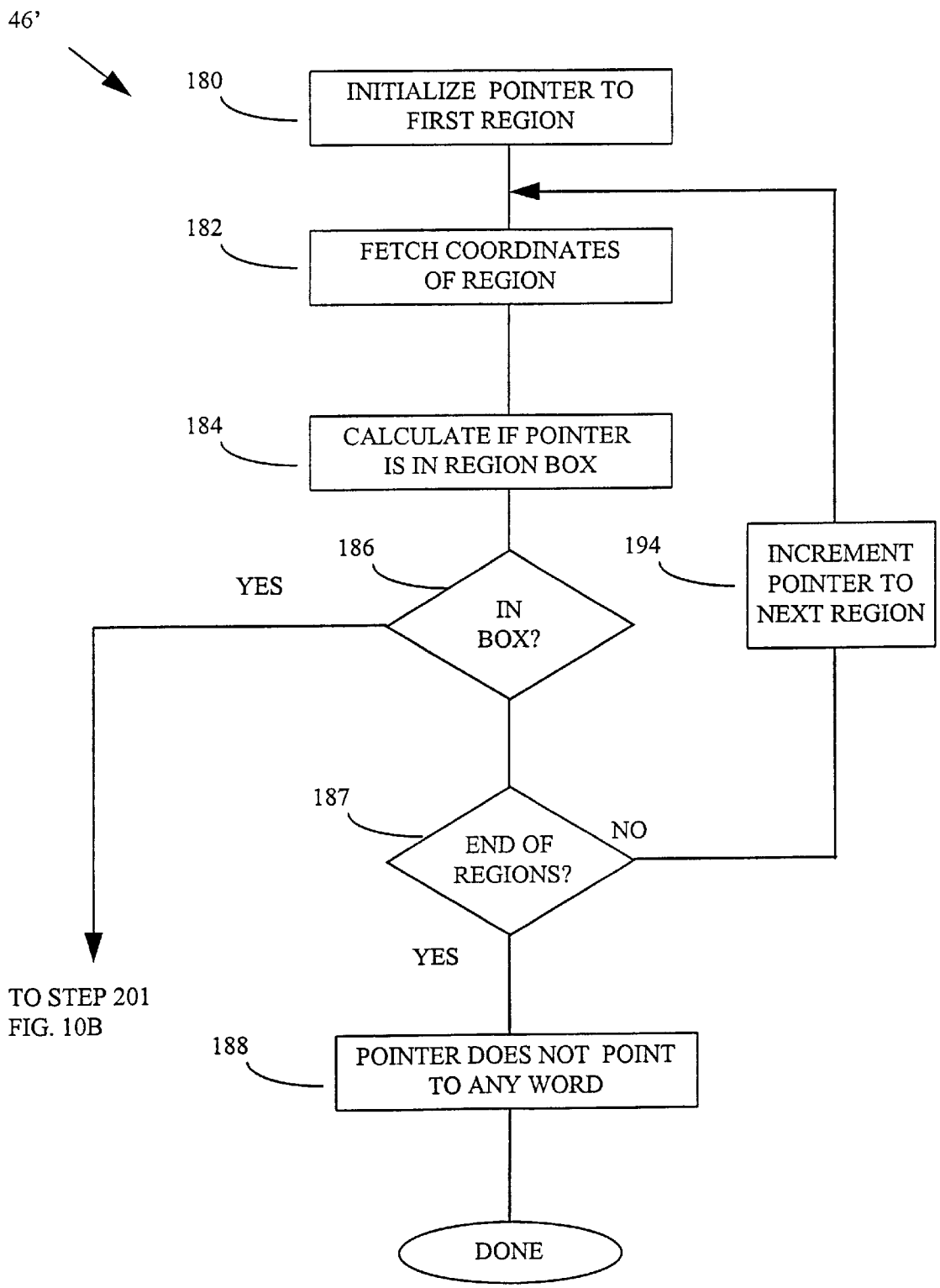
FIGS. 10A–10C are flow charts of an alternative embodiment for determining the nearest word.
Figure 10B:
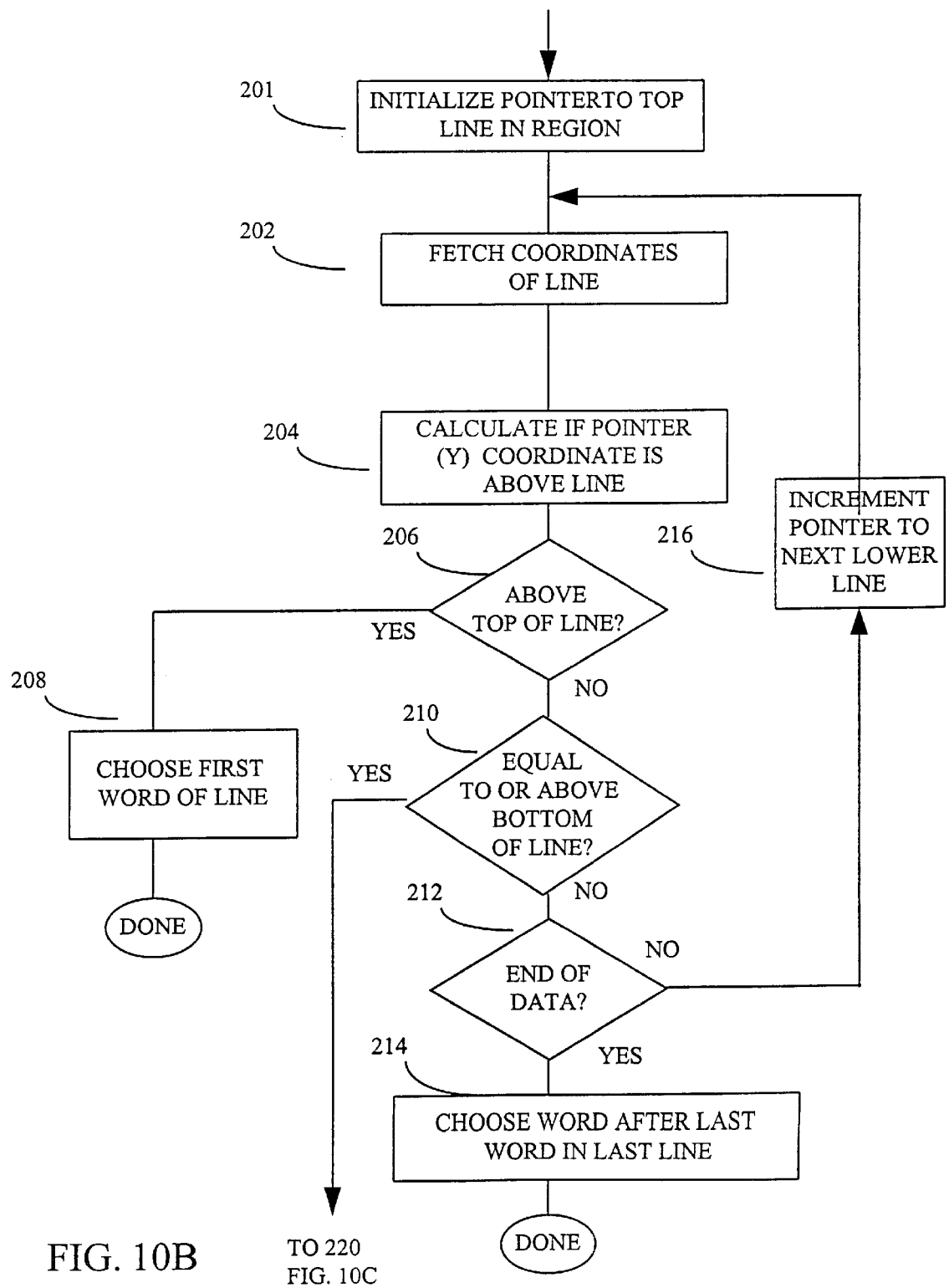
Figure 10C:
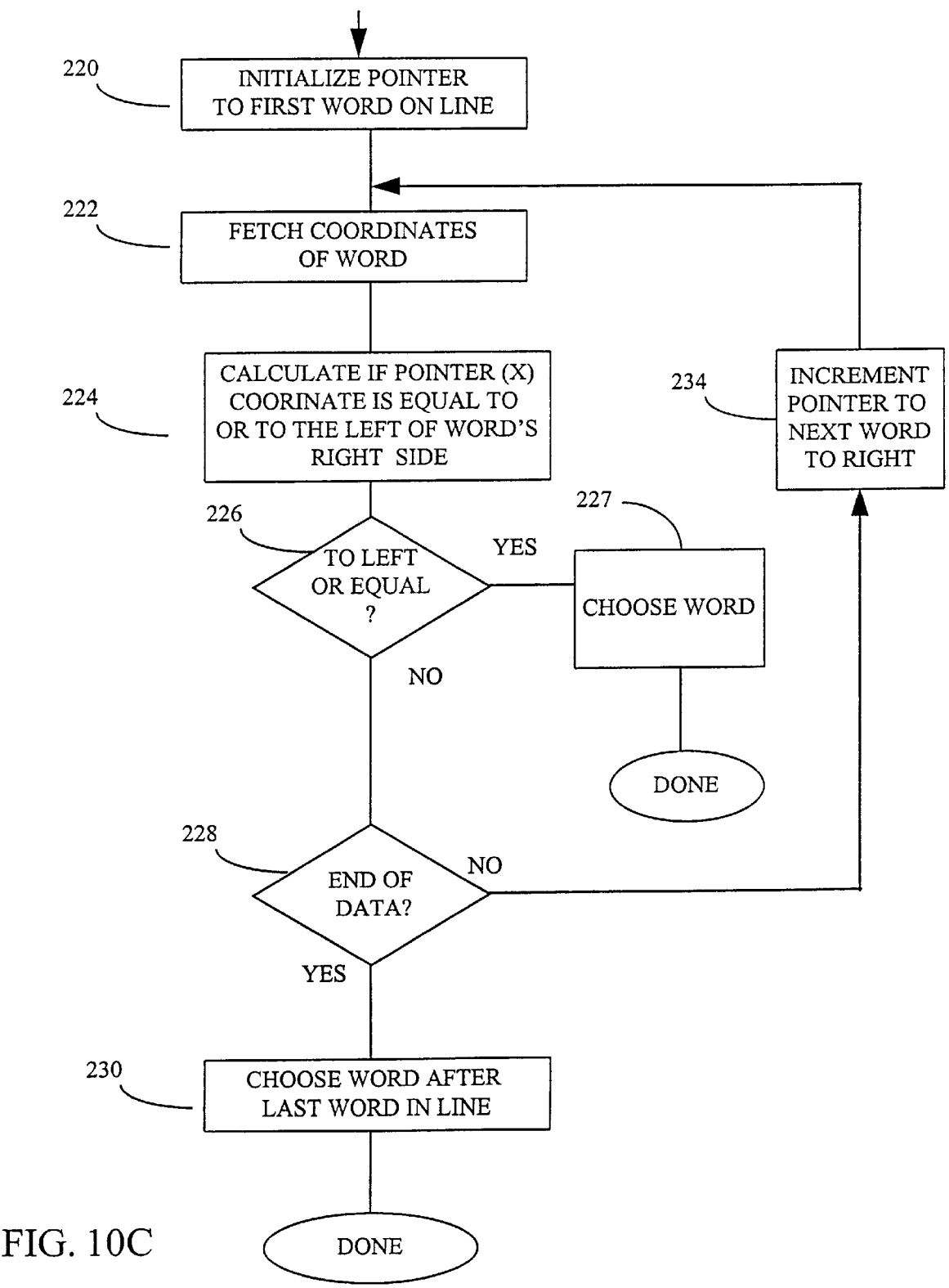

The approach as shown in conjunction with FIGS. 10A–10C will tend to mitigate some of these errors.

Referring now to FIG. 10A, pointers are again initialized to a first one of the regions, as shown by step 180 and the coordinates of the region's boundary box are fetched at step 182 from the data structure 120. The position (X, Y) of the pointer is calculated to determine whether or not it falls within a box defining a region.

To further illustrate this process, reference is also made to FIG. 11 which shows a sample region containing a plurality of lines of image text and boxes illustrated about the region, lines and word. Also three sample positions 61, 61a, 61b of the pointing device (not shown) are illustrated.

The calculation for a region is performed in a similar manner as for calculating a box for a word described in conjunction with FIGS. 5A to 5C except that the positional information contained within the region data structure 120 is used to determine a box or other boundary associated with the region. Coordinates $(r_6,s_6)$ and $(t_6,u_6)$ denote the imaginary box about the illustrated region in FIG. 11. If at step 186 it is determined that the coordinates of the pointer fall within the box (as 61 and 61a–61d, FIG. 11), then the process branches to determine the nearest line in step 201 (FIG. 10B). Otherwise processing continues to step 187 to determine whether or not the process has reached the last region in the region data structure 120. If it has not reached the last structure the pointer is incremented in step 194 point to the next region in the data structure 120. If the process 46' has reached the last structure hence the coordinates of the pointer device do not point to any word, as 61, (FIG. 11). Therefore, a previously determined word is used, and the process exits.

If at step 186 it was determined that the coordinates fall within a region's box, then at step 201 a similar process is used to determine the nearest line except that the line data associated with the data structure 130 (FIG. 8) is used for positional information and index information such as coordinates $(l_4,m_4)$ and $(n_4,o_4)$. Again for each line within the particular region, positional information is used to determine whether the coordinates of the pointing device are within a box defined about the line by the positional information associated with the line. If the coordinates of the positioning device fall above the box associated with the line as point 61a, then the software will choose the first word of the line here the word "TEXT". If the coordinates fall above the bottom of the line box as point 61b, then the software branches to step 220.

As shown in conjunction with FIG. 10B, the software initializes a pointer to the top line in the region (at step 201) and fetches the coordinates of the line at step 202. The coordinates which are fetched correspond to the top and bottom coordinates of an imaginary box positioned about the line. At step 204 the software calculates to determine whether the Y coordinate of the pointing device is above the line. This is accomplished by comparing the value of the Y coordinate of the pointing device to the Y coordinate $(m_4)$ of the uppermost point defining the box about the line, as shown for point 61b. If at step 206 it is determined that the Y coordinate is above the box defined about the line, the software chooses the first word on line step 208 and is done. Otherwise, the software determines whether the Y coordinate is above the bottom of the box defining the line by using a similar approach as for the top of the line except using, for example, the coordinate $(0_4)$. If it is determined that the Y coordinate is equal to or above the bottom of the box defining the line, as point 61b then the software branches to step 220 (FIG. 10C).

The X coordinate of the pointer is already known to be in the region and is not checked here. This allows for short lines to be detected. Lines are often shorter than the width of the region. For example, short lines may occur at the beginning and end of paragraphs or in text that is not justified to form a straight right margin. Otherwise, it continues to step 212 where it is determined whether the current line is the last line in the data structure 230. If it is not the last line in data structure 230, the pointer is incremented at step 216 to point to the next lower line in the region. If it is the last line in the data structure and the Y coordinate was not above the top of the line nor above the bottom of the line, the software chooses at step 214 the word after the word in the last line as for point 61c and is done.

Referring now to FIG. 10C, pointers are again initialized to a first one of the words on a line, as shown by step 220 and the coordinates of the word are fetched at step 222 from the data structure 140. The position X of the pointer is calculated to determine whether or not it falls at or to the left of the current word's right side at step 224 as for point 61a.

This calculation is performed by comparing the X value of the pointer coordinate to the X value of the right side of the box defined about the word here coordinate as of point $(a_5,b_5)$. If the value of the X coordinate for the box is less than or equal to that of the X coordinate of the pointing device, then the pointing device is considered pointing to the left side of the word's right side. At step 226 it is determined whether the pointer points to the left side of the word's right side. If it does, the particular word "TEXT" is chosen for point 61*d* at step 227 and the process is done. Otherwise, at step 228, the process determines whether or not it has reached the last word in the data structure 140. If it has not reached the last word in the data structure 140 the pointer is incremented at step 234 to point to the next word to the right. If it has reached the last word in the data structure 140, the software at step 230 will choose the word after the last word in the line (not illustrated) and the process is done.

The chosen word is forwarded on to steps 48 of FIG. 3. In this manner double highlighting, as described in conjunction with FIG. 5, and speech synthesis as described above are performed on the word chosen by this process.

Having described preferred embodiments of the invention it will be noted that other embodiments incorporating their concepts may be used. Accordingly, it is felt that the invention should not be limited to the disclosed embodiments but rather should only be limited by the spirit and scope of the appended claims.

What is claimed is:

1. A computer program residing on a computer readable medium comprising instructions for causing a computer to
   image display a representation of a scanned document on a computer monitor;
   apply a first highlighting indicia to a portion of the image representation as displayed on a computer monitor in accordance with positional information linking the displayed image representation of the document to a converted text file representation of the document;
   apply a second highlighting indicia to a selected word in the selected portion of the document, in accordance with positional information linking the position of the word in the image to a converted text file representation of the image.

2. The computer program of claim 1 further comprising instructions for causing the computer to read the word aloud to a user.

3. The computer program of claim 1 further comprising instructions for causing the computer to:
   extract text corresponding to the word from the converted text file;
   apply the extracted text representation of the word to a speech synthesizer to produce signals to cause the computer to output a synthesized speech representation of the word, that is synchronized to the second highlighting indicia applied to the word.

4. The computer program as recited in conjunction with claim 3 further comprising instructions for causing the computer to fetch coordinates of the next word in the selected unit of text, turning off the previous highlighting of the previous word and apply highlighting to the new word in the text.

5. The computer program as recited in claim 2 further comprising instructions for causing the computer to check if each one of the words in the selected portion of the document have been read aloud by the computer;
   if all the words have been read aloud by the computer, clearing the current first level of highlighting from the selected unit.

6. The computer program as recited in claim 5 further comprising computer instructions for causing the computer to find the next unit of the displayed image and apply a new first level of highlighting to the next unit.

7. The computer program as recited in conjunction with claim 6 further comprising instructions for causing the computer to fetch coordinates of the next word in the selected unit of text, turning off the previous highlighting of the previous word and apply highlighting to the new word in the text.

8. The computer program as recited in conjunction with claim 1 wherein the portion of the document to which the first highlighting indicia is applied to is a line in the document.

9. The computer program as recited in conjunction with claim 1 wherein the portion of the document to which the first highlighting indicia is applied to is a sentence in the document.

10. The computer program as recited in conjunction with claim 1 wherein the portion of the document to which the first highlighting indicia is applied to is a paragraph in the document.

11. The computer program product as recited in claim 1 wherein the positional information linking the displayed image representation is positional information provided in the converted text file representation of the document.

12. A computer program residing on a computer readable medium comprising instructions for causing a computer to
    display an bit-mapped or text representation of a document on a computer monitor;
    apply a first highlighting indicia to a portion of the document as displayed on a computer monitor in accordance with positional information linking the displayed image representation of the document to a converted text file representation of the document;
    apply a second highlighting indicia to a selected word in the selected portion of the document, in accordance with positional information linking the position of the word in the image to a converted text file representation of the image; and
    read the word aloud to a user.

13. The computer program product of claim 12 wherein the positional information linking the displayed image representation is positional information provided in the converted text file representation of the document.

14. The method of claim 12 further comprising:
    extracting text corresponding to the word from the converted text file; and
    applying the extracted text representation of the word to a speech synthesizer to produce a synthesized speech representation of the word, that is synchronized to the second highlighting indicia applied to the word.

15. The method of claim 12 further comprising
    checking if each one of the words in the selected portion of the document have been read aloud by the computer;
    if all the words have been read aloud by the computer, clearing the current first level of highlighting from the selected unit.

16. The method of claim 15 further comprising
    finding the next unit of the displayed image; and
    applying a new first level of highlighting to the next unit.

17. The method of claim 15 further comprising:
    fetching coordinates of the next word in the selected unit of text;

turning off the previous highlighting of the previous word; and applying highlighting to the new word in the text.

18. A method for presenting a document on a display comprises:

displaying a representation of a scanned document on a computer monitor;

applying a first highlighting indicia to a portion of the document as displayed on a computer monitor in accordance with positional information linking the displayed image representation of the document to a converted text file representation of the document;

applying a second highlighting indicia to a selected word in the selected portion of the document, in accordance with positional information linking the position of the word in the image to a converted text file representation of the image.

19. The method of claim 18 wherein the positional information linking the displayed image representation is positional information provided in the converted text file representation of the document.

20. A computer system comprising:

a display for displaying a representation of a scanned document on a computer monitor;

a processor coupled to the computer monitor;

a computer readable medium comprising instructions for causing the processor to:

apply a first highlighting indicia;

apply a first highlighting indicia to a portion of the image representation as displayed on the computer monitor in accordance with positional information linking the displayed image representation of the image to the converted text file representation of the image;

apply a second highlighting indicia to a selected word in the selected portion of the image representation in accordance with positional information linking the position of the word in the image to a converted text file representation of the image.

21. The system of claim 20 wherein the positional information linking the displayed image representation to the converted text file is stored with the converted text file.

* * * * *